(12) United States Patent
Schmidt et al.

(10) Patent No.: US 6,878,427 B2
(45) Date of Patent: Apr. 12, 2005

(54) ENCASED INSULATION ARTICLE

(75) Inventors: Richard John Schmidt, Roswell, GA (US); Bruce Scott Williamson, Alpharetta, GA (US); Michael Lawrence Gross, Atlanta, GA (US)

(73) Assignee: Kimberly Clark Worldwide, Inc., Neenah, WI (US)

( * ) Notice: Subject to any disclaimer, the term of this patent is extended or adjusted under 35 U.S.C. 154(b) by 37 days.

(21) Appl. No.: 10/324,484

(22) Filed: Dec. 20, 2002

(65) Prior Publication Data

US 2004/0121110 A1 Jun. 24, 2004

(51) Int. Cl.$^7$ ................................................. B32B 1/02
(52) U.S. Cl. ............................ 428/71; 428/74; 428/76
(58) Field of Search ............................ 428/71, 74, 76, 428/68

(56) References Cited

U.S. PATENT DOCUMENTS

| | | |
|---|---|---|
| 3,338,992 A | 8/1967 | Kinney |
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 3,855,046 A | 12/1974 | Hansen et al. |
| D239,566 S | 4/1976 | Vogt |
| 4,041,203 A | 8/1977 | Brock et al. |
| D264,512 S | 5/1982 | Rogers |
| 4,340,563 A | 7/1982 | Appel et al. |
| 4,374,888 A | 2/1983 | Bornslaeger |
| 4,493,868 A | 1/1985 | Meitner |
| 4,837,067 A | 6/1989 | Carey, Jr. et al. |
| 5,108,820 A | 4/1992 | Kaneko et al. |
| 5,108,827 A | 4/1992 | Gessner |
| 5,188,885 A | 2/1993 | Timmons et al. |
| 5,294,482 A | 3/1994 | Gessner |
| 5,336,552 A | 8/1994 | Strack et al. |
| 5,362,539 A | 11/1994 | Hall et al. |
| 5,382,400 A | 1/1995 | Pike et al. |

(Continued)

FOREIGN PATENT DOCUMENTS

| | | |
|---|---|---|
| EP | 0462574 | 12/1991 |
| WO | WO 98/54388 | 12/1998 |
| WO | 01/49531 A1 | 7/2001 |

OTHER PUBLICATIONS

Cowie, J.M.G., Chapter 7, "Polymers in Solution," *Polymers: Chemistry and Physics of Modern Materials*, 1973, pp. 142–145.

(Continued)

*Primary Examiner*—Alexander S. Thomas
(74) *Attorney, Agent, or Firm*—Ralph H. Dean, Jr.; Robert A. Ambrose (57) ABSTRACT

The present invention relates to an insulation article having a core of an insulation material encased within a fabric material. The fabric material is prepared from thermoplastic fibers having an average fiber diameter less than about 12 microns. Examples of the fabric material include woven, knit or nonwoven materials. The insulation material may be any conventional insulation material, including foams and fibrous materials. Examples of uses for the encased insulation material of the present invention include architectural applications such as attics, basements and crawl spaces in homes, commercial buildings and in heating, venting and air conditioning systems (HVAC), around appliances, such as dishwashers, refrigerators, clothes washing machines and the like, in vehicles such as cars, trucks, trains, airplanes and the like.

15 Claims, 2 Drawing Sheets

U.S. PATENT DOCUMENTS

| | | | |
|---|---|---|---|
| 5,501,872 A | | 3/1996 | Allen et al. |
| 5,533,218 A | * | 7/1996 | Fahy .............................. 5/636 |
| 5,624,726 A | | 4/1997 | Sanocki et al. |
| 5,755,900 A | | 5/1998 | Weir et al. |
| 5,759,659 A | | 6/1998 | Sanocki et al. |
| 5,759,926 A | | 6/1998 | Pike et al. |
| 5,848,509 A | | 12/1998 | Knapp et al. |
| 5,858,515 A | | 1/1999 | Stokes et al. |
| 5,895,710 A | | 4/1999 | Sasse et al. |
| 5,935,883 A | | 8/1999 | Pike |
| 6,200,669 B1 | | 3/2001 | Marmon et al. |
| 6,277,469 B1 | | 8/2001 | Wildeman |
| 6,352,948 B1 | | 3/2002 | Pike et al. |
| 2002/0074697 A1 | | 6/2002 | Steinke et al. |

OTHER PUBLICATIONS

Federal Test Method 5450, Standard No. 191A, "Permeability to Air; Cloth; Calibrated Orifice Method", Jul. 1978.

American Society for Testing and Materials (ASTM) Designation: F797–88, "Standard Practice for Determining the Performance of a Filter Medium Employing a Multipass, Constant–Rate, Liquid Test," Dec. 1988, pp. 784–789.

American Society for Testing and Materials (ASTM) Designation: E1050–98, "Standard Test Method for Impedance and Absorption of Acoustical Materials Using a Tube, Two Microphones and a Digital Frequency Analysis System," Aug. 1998, pp. 1–11.

* cited by examiner

ENCASED INSULATION ARTICLE

FIELD OF THE INVENTION

The present invention is directed to an insulation material which is encased in a fabric material containing thermoplastic microfibers.

BACKGROUND OF THE INVENTION

Insulation has been used to insulate a wide of variety of locations where thermal insulation or sound attenuation is desired or required. Insulation has been used, for example, in vehicles, in walls, floors, ceilings and attics of building, in and around appliances and the like. Available insulation materials have several drawbacks, including moisture uptake, the fibers of fibrous insulation material may become airborne during handling and installation, and the insulation material may become embedded in the installer's skin, causing irritation and possibly infection.

To solve the problems of moisture uptake and fibrous insulation becoming airborne during handling and installation, the insulation material has been encased in film materials. (See, for example, U.S. Pat. No. 5,362,539 to Hall et al. and U.S. Pat. No. 5,624,726 to Sanocki et al.). Films have drawbacks as an insulation encasement material including the film traps air around the insulation material creating a "pillow" or "balloon" effect, making it difficult to transport the encased insulation material and to manipulate the insulation material during installation so that it can fill a cavity to be filled. To overcome this problem, vents are inserted into the film to allow trapped air to escape from the encasement. However, these vents may allow for the insulation material to escape from the encasement and may allow water to enter inside the encasement and wet the insulation material, thereby defeating one of the purposes for encasing the insulation material.

In addition, film materials do not provide sound attenuation properties over a wide range of frequencies, since the film is non-porous. In applications where sound insulation is needed or desired, the films are not a very effective in attenuating sound. Therefore, there is a need in the art for a sound insulation material which is encased to avoid the problems associated with unencased insulation materials, while the encasement material provides improved sound insulation properties.

SUMMARY OF THE INVENTION

The present invention relates to an insulation article having a core of an insulation material encased within a fabric material. The fabric material is prepared from thermoplastic fibers having an average fiber diameter less than about 12 microns. Examples of the fabric material include woven, knit or nonwoven materials. The insulation material may be any conventional insulation material, including foams and fibrous materials.

It has been discovered that encasing an insulation material with a fabric material prepared from thermoplastic fibers having an average fiber diameter less than about 12 microns results in a product which alleviates the problems associated with fibrous insulation materials while providing an improvement in the sound attenuation properties of the insulation material and the currently available film encased material.

DEFINITIONS

As used herein, the term "comprising" is inclusive or open-ended and does not exclude additional unrecited elements, compositional components, or method steps.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates and materials added to enhance processability of the composition.

As used herein, the term "fiber" includes both staple fibers, i.e., fibers which have a defined length between about 19 mm and about 60 mm, fibers longer than staple fiber but are not continuous, and continuous fibers, which are sometimes called "substantially continuous filaments" or simply "filaments". The method in which the fiber is prepared will determine if the fiber is a staple fiber or a continuous filament. These fibers can be formed into yarns, which can be used to form woven and knit products. The fibers can also be used to form nonwoven webs.

As used herein, the term "nonwoven web" means a web having a structure of individual fibers or threads which are interlaid, but not in an identifiable manner as in a knitted web. Nonwoven webs have been formed from many processes, such as, for example, meltblowing processes, spunbonding processes, air-laying processes, coforming processes and bonded carded web processes. The basis weight of nonwoven webs is usually expressed in ounces of material per square yard (osy) or grams per square meter (gsm) and the fiber diameters useful are usually expressed in microns, or in the case of staple fibers, denier. It is noted that to convert from osy to gsm, multiply osy by 33.91.

As used herein, the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, which is hereby incorporated by reference in its entirety. Meltblown fibers are microfibers, which may be continuous or discontinuous, and are generally smaller than 10 microns in average diameter The term "meltblown" is also intended to cover other processes in which a high velocity gas, (usually air) is used to aid in the formation of the filaments, such as melt spraying or centrifugal spinning.

As used herein the term "spunbond fibers" refers to small diameter fibers of molecularly oriented polymeric material. Spunbond fibers may be formed by extruding molten thermoplastic material as filaments from a plurality of fine, usually circular capillaries of a spinneret with the diameter of the extruded filaments then being rapidly reduced as in, for example, U.S. Pat. No. 4,340,563 to Appel et al., and U.S. Pat. No. 3,692,618 to Dorschner et al., U.S. Pat. No.

3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, and U.S. Pat. No. 5,382,400 to Pike et al. Spunbond fibers are generally not tacky when they are deposited onto a collecting surface and are generally continuous. Spunbond fibers are often about 10 microns or greater in diameter. However, fine fiber spunbond webs (having an average fiber diameter less than about 10 microns) may be achieved by various methods including, but not limited to, those described in commonly assigned U.S. Pat. No. 6,200,669 to Marmon et al. and U.S. Pat. No. 5,759,926 to Pike et al., each is hereby incorporated by reference in its entirety.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein, the term "multicomponent fibers" refers to fibers or filaments which have been formed from at least two polymers extruded from separate extruders but spun together to form one fiber. Multicomponent fibers are also sometimes referred to as "conjugate" or "bicomponent" fibers or filaments. The term "bicomponent" means that there are two polymeric components making up the fibers. The polymers are usually different from each other, although conjugate fibers may be prepared from the same polymer, if the polymer in each component is different from one another in some physical property, such as, for example, melting point or the softening point. In all cases, the polymers are arranged in substantially constantly positioned distinct zones across the cross-section of the multicomponent fibers or filaments and extend continuously along the length of the multicomponent fibers or filaments. The configuration of such a multicomponent fiber may be, for example, a sheath/core arrangement, wherein one polymer is surrounded by another, a side-by-side arrangement, a pie arrangement or an "islands-in-the-sea" arrangement. Multicomponent fibers are taught in U.S. Pat. No. 5,108,820 to Kaneko et al.; U.S. Pat. No. 5,336,552 to Strack et al.; and U.S. Pat. No. 5,382,400 to Pike et al.; the entire content of each is incorporated herein by reference. For two component fibers or filaments, the polymers may be present in ratios of 75/25, 50/50, 25/75 or any other desired ratios.

As used herein, the term "multiconstituent fibers" refers to fibers which have been formed from at least two polymers extruded from the same extruder as a blend or mixture. Multiconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Fibers of this general type are discussed in, for example, U.S. Pat. Nos. 5,108,827 and 5,294,482 to Gessner.

As used herein, the term "pattern bonded" refers to a process of bonding a nonwoven web in a pattern by the application of heat and pressure or other methods, such as ultrasonic bonding. Thermal pattern bonding typically is carried out at a temperature in a range of from about 80° C. to about 180° C. and a pressure in a range of from about 150 to about 1,000 pounds per linear inch (59–178 kg/cm). The pattern employed typically will have from about 10 to about 250 bonds/inch$^2$ (1–40 bonds/cm$^2$) covering from about 5 to about 30 percent of the surface area. Such pattern bonding is accomplished in accordance with known procedures. See, for example, U.S. Design Pat. No. 239,566 to Vogt, U.S. Design Pat. No. 264,512 to Rogers, U.S. Pat. No. 3,855,046 to Hansen et al., and U.S. Pat. No. 4,493,868 to Meitner et al. and U.S. Pat. No. 5,858,515 to Stokes et al., for illustrations of bonding patterns and a discussion of bonding procedures, which patents are incorporated herein by reference. Ultrasonic bonding is performed, for example, by passing the multilayer nonwoven web laminate between a sonic horn and anvil roll as illustrated in U.S. Pat. No. 4,374,888 to Bornslaeger, which is hereby incorporated by reference in its entirety.

As used herein the term "denier" refers to a commonly used expression of fiber thickness which is defined as grams per 9000 meters. A lower denier indicates a finer fiber and a higher denier indicates a thicker or heavier fiber. Denier can be converted to the international measurement "dtex", which is defined as grams per 10,000 meters, by dividing denier by 0.9.

As used herein, the phrase "sound attenuation" refers to absorption and/or reflection of incident sound waves.

As used herein, the term "insulation" refers to thermal and/or acoustical insulation.

As used herein, the phrase "article of manufacture" refers to an article other than the encased insulation material of the present invention. Articles of manufacture include, for example, small appliances, such as blenders, food processors and the like; larger appliances, such as dish washers, refrigerators, clothes washing machines and the like; vehicles, such as automobiles, trucks, airplanes and the like; and buildings. Other articles which are intended to be included in this definition include articles which may be in need of thermal and/or acoustical insulation properties.

DETAILED DESCRIPTION OF THE INVENTION

Figure 1:
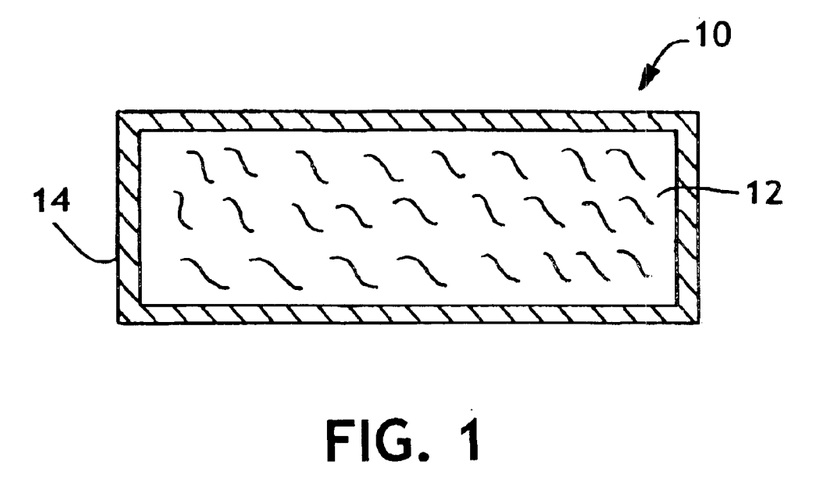
FIG. 1 shows a cross-sectional view of the article of the present invention.
Figure 2:
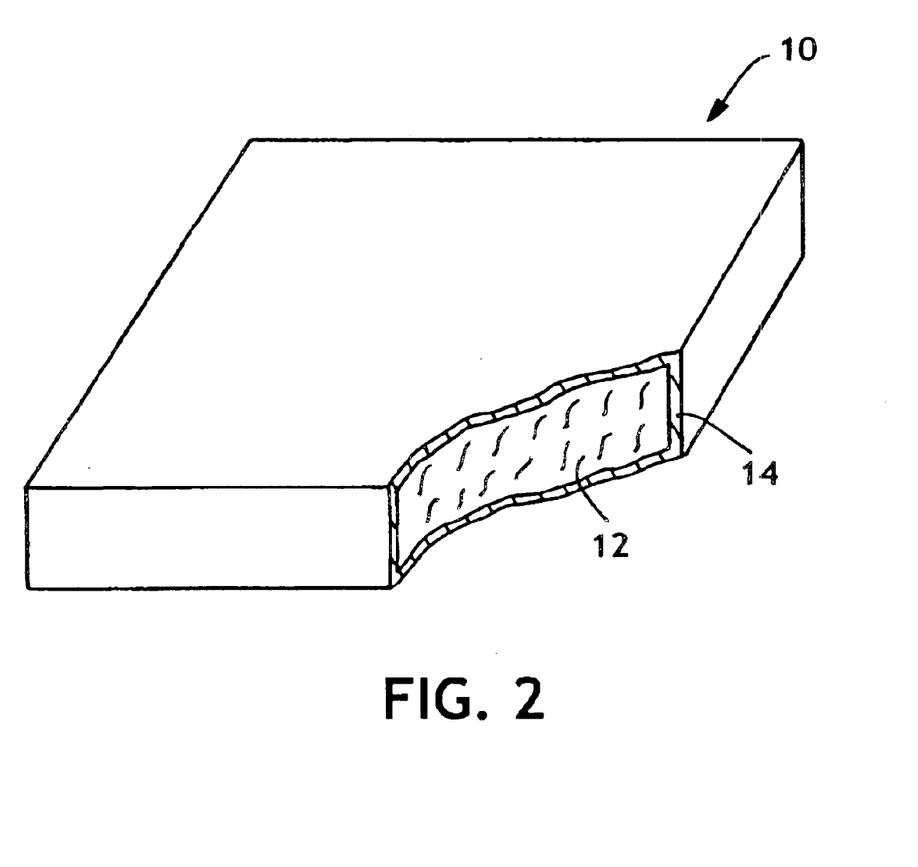
FIG. 2 shows a three-dimensional cut-away view of the article of the present invention.

The present invention relates to an insulation article having a core of an insulation material encased within a fabric material. To gain a better understanding of the present invention, attention is directed to FIG. 1 which shows a representative insulation article 10 of the present invention. An insulation core 12 is encased and totally surrounded by an outer shell 14. FIG. 2 shows a three-dimensional representation of an article of the present invention. The fabric material is prepared from thermoplastic fibers having an average fiber diameter less than about 12 microns and may be a woven, knit or a nonwoven material.

The insulation material 12 may include fibrous insulation, foam insulation, or a combination thereof. Preferably, the insulation material does exhibit some sound attenuation properties in addition to, if desired, thermal insulation properties. Examples of the insulation material include, for example, fiberglass batts, lofty nonwoven webs from staple fiber, and other high loft batts, such as polyester high lofts and high loft meltblown.

The actual insulation material 12 is not critical to the present invention, but fibrous insulation material is generally preferred from the standpoint of cost and transporting. Generally desired, however, is a lofty fibrous insulation. Suitable fibrous materials include fiberglass, polymer fibers (e.g., polypropylene fibers such as melt blown polypropylene fibers commercially available from The 3M Company of St. Paul, Minn. under the trade designation "THINSULATE"), chopped glass fibers (e.g., magnesium aluminosilicate glass fibers commercially available under the trade designation "S2-GLASS" from Owens-Corning Fiberglass Corp. of Granville, Ohio), and ceramic oxide fibers (e.g. small diameter meltblown aluminosilicate ceramic fibers commercially available under the trade designations "FIBERFRAX" from Unifrax Co., Niagara Falls, N.Y., as well as ceramic oxide fibers commercially available from the 3M Company under the trade designation "NEXTEL" (e.g., aluminosilicate ceramic oxide fibers, aluminoborosilicate ceramic oxide fibers, and alumina ceramic oxide fibers).

The fibrous insulation may be provided in the form of a lofty nonwoven mat in which the fibers are entangled with or bonded to each other. Such mats are prepared according to conventional techniques such as melt blowing, air laying, or carding. The mats can be made by thermally bonding fibers by exposing thermally bondable fibers to heat, causing the thermally bondable fibers to soften and bind at least some of the fibers together.

An example of a particularly preferred lofty nonwoven mat is described in U.S. Pat. No. 4,837,067 (Carey et al.), the disclosure of which is hereby incorporated by reference. As described therein, the mat consists of a combination of entangled staple fibers and bonding staple fibers where the bonding fibers have a core of polyethylene terephthalate surrounded by a sheath of an adhesive polymer formed from isophthalate and terephthalate esters.

Examples of foams which are useful for insulation layer 14 include polymeric foams such as, for example, polyurethane and polyimide foams.

The fabric material 14 encasing the insulation material 12, may be a woven web, a knit web or a nonwoven web. It has been discovered that if the fabric material is made from thermoplastic fibers having an average fiber size less than 12 microns, the fabric improves the acoustical properties of the insulation article of the present invention. The fabric material may be a single layer or a laminated fabric. The fibers used to prepare the fabric may be staple fibers or continuous fibers.

Suitable thermoplastic polymers useful in preparing the fabric material include polyolefins, polyesters, polyamides, polycarbonates, polyurethanes, polyvinylchloride, polytetrafluoroethylene, polystyrene, polyethylene terephthalate, biodegradable polymers such as polylactic acid and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly(1-butene) and poly (2-butene); polypentene, e.g., poly(1-pentene) and poly(2-pentene); poly(3-methyl-1-pentene); poly(4-methyl 1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polytrimethylene terephthalate, polybutylene terephthalate, polytetramethylene terephthalate, polycyclohexylene-1,4-dimethylene terephthalate, and isophthalate copolymers thereof, as well as blends thereof.

Examples of the nonwoven fabrics which can be used to encase the insulation material include, for example, a spunbond nonwoven web, a meltblown nonwoven web, an air-laid nonwoven web, or a bonded carded web. In addition, nonwoven fabric may be a laminate of two or more of these nonwoven webs. Selection of the nonwoven web or webs will determine the properties of the encasing material. For example, spunbond nonwoven webs are known to have strength, while others, such as meltblown nonwoven webs are known to have barrier properties, especially when the meltblown fibers result in a nonwoven web having a low loft structure.

The fiber diameter of the thermoplastic polymers is important to the present invention. If the fiber diameter is greater than about 12 microns, the permeability of the encasing fabric tends to be increased and the pressure drop of the encasing fabric tends to be decreased, which generally corresponds to a decrease in the sound attenuating properties. Desirably, the fiber size and the resulting properties are dependent on the method in which the fibers are formed. Generally, the smaller the fiber diameter, the better the barrier and acoustical properties the encasing fabric will have. The lower limit for the average fiber diameter is approximately 0.1 microns.

Meltblown nonwoven webs are known in the art and have been used in a wide variety of applications, including wipes, filtration material and acoustical insulation. The meltblown nonwoven web used to encase the insulation material in the present invention is characterized in that it contains relatively closely distributed meltblown fibers that are randomly dispersed and autogenously bonded. It should be noted that the meltblown nonwoven web used to encase the insulation material is different from the insulation material in that the meltblown nonwoven web in the encasing material is not lofty and the fibers are generally densely packed. Typically, the density of the meltblown encasing material 14 is greater than about 40 kg/m$^3$, while the meltblown used in the insulation material generally has a density less than about 40 kg/m$^3$. These properties are responsible for the relatively high pressure drop and low permeability, which are believed to be at least partially responsible for the additional sound attenuating properties imparted to the insulation material from the encasing material. The meltblown nonwoven web is very effective in improving the sound attenuation properties of the insulation material 12.

The thermoplastic meltblown fibers have an average fiber diameter of less than about 12 microns. Desirably, the thermoplastic meltblown fibers have an average fiber diameter less than about 7 microns and more desirably between about 1.0 microns to about 7.0 microns and most desirably between about 2.0 microns to about 6.0 microns. If the average fiber diameter is greater than about 12 microns, the permeability of the acoustical insulation tends to be increased and the pressure drop of the acoustical insulation tends to be decreased, which generally corresponds to a decrease in the sound attenuating properties associated with the encasing material 14.

The encasing material 14 may also be prepared from spunbond fibers. Spunbond fibers have advantages over meltblown fibers in that spunbond fibers have a higher degree of molecular orientation than meltblown fibers. This results in a fabric having greater strength as compared to meltblown fabrics. As with the meltblown fibers, the fiber diameter of the spunbond fibers should be less than 12 microns. Typically, spunbond fibers have an average fiber diameter in excess of about 10 micron; however, those skilled in the art are able to make small diameter spunbond fibers by, for example, increasing the draw of the fibers. Other methods of decreasing the fiber diameter of spunbond fibers include, for example, splitting splittable fibers by methods known in the art. On such method is described in U.S. Pat. No. 5,759,926, to Pike et al., which is hereby incorporated by reference in its entirety.

There are various methods known in the art for splitting filaments and fibers. For example, a known method for producing split fiber structures includes the steps of forming fibrillizable or splittable multicomponent conjugate fibers into a fibrous structure and then treating the fibrous structure. The multicomponent fibers can have many different configurations including a side-by-side configuration, a wedge configuration or a sectional configuration and the like. The individual segments, although of varied shape, preferably have distinct boundaries or zones across the cross-section of the fiber. It is preferred that the shapes are well defined or "distinct" in the that they do not occlude or overlap adjacent segments along the outer surface of the multicomponent fiber. This overlap will often impede and/or prevent separation of the individual segments, particularly where one segment is fully engulfed by one or more other segments. Thus, "wrap around" is therefore preferably avoided and the formation of well defined or distinct shapes highly desirable. In a further aspect, it is desirable that the cross-sectional configuration of the multicomponent fiber is such that components or segments of identical or miscible polymers either have minimal or avoid all contact with one another. Generally, the components of the fibers are selected such that they are incompatible with one another.

The term "incompatible polymers" as used herein indicates polymers that do not form a miscible blend, i.e., immiscible, when melt blended. As a desirable embodiment of the present invention, differences in the polymer solubility parameter ($\delta$) are used to select suitably incompatible polymers. The polymer solubility parameters ($\delta$) of different polymers are well known in the art. A discussion of the solubility parameter is, for example, disclosed in Polymer: Chemistry and Physics of Modern Materials, pages 142–145, by J M G Cowie, International Textbook Co., Ltd., 1973. Desirably, the adjacently disposed polymer components of the present conjugate fiber have a difference in the solubility parameter of at least about 0.5 $(cal/cm^3)^{1/2}$, more desirably at least about 1 $(cal/cm^3)^{1/2}$, most desirably at least about 2 $(cal/cm^3)^{1/2}$. The upper limit of the solubility parameter difference is not critical for the present invention since the higher the difference, the more spontaneous the splitting of the fiber becomes.

Illustrative examples of particularly desirable pairs of incompatible polymers useful for the present invention include polyolefin-polyamide, e.g., polyethylene-nylon 6, polyethylene-nylon 6/6, polypropylene-nylon 6, polypropylene-nylon 6/6, polyethylene-a copolymer of caprolactam and alkylene oxide diamine, and polypropylene a copolymer of caprolactam and alkylene oxide diamine; polyolefin-polyester, e.g., polyethylene-polyethylene terephthalate, polypropylene-polyethylene terephthalate, polyethylene-polybutylene terephthalate and polypropylene-polybutylene terephthalate; and polyamide polyester, e.g., nylon 6-polyethylene terephthalate, nylon 6/6-polyethylene terephthalate, nylon 6-polybutylene terephthalate, nylon 6/6-polybutylene terephthalate, polyethylene terephthalate—a copolymer of caprolactam and alkylene oxide diamine, and polybutylene terephthalate—a copolymer of caprolactam and alkylene oxide diamine and polypropylene.

Generally, the fibers are directly formed onto a forming surface to form a nonwoven fabric. Once the fabric is formed, the fibers may be split by subjecting the fibers to one of many treatments known to those skilled in the art, including but not limited to, subjecting the fibers to a heated aqueous environment, or by mechanically working the fibers. In the present invention, it is desirable to split the fibers using a hot aqueous liquid. After the fibers are split, the spunbond fabric of split fibers may be bonded using conventional bonding techniques, such as thermal bonding or ultrasonic bonding. Depending on the configuration of the fibers used to make the splittable spunbond fibers, the split fibers have an average fiber diameter less than about 12 microns and usually in the range of about 3 to 12 microns, typically in the range of about 5 to about 8 microns.

Another nonwoven web which can be used in the present invention is a bonded carded web, also known as a "BCW". "Bonded carded web" refers to webs that are made from staple fibers which are sent through a combing or carding unit, which separates or breaks apart and aligns the staple fibers in the machine direction to form a generally machine direction-oriented fibrous nonwoven web. Such fibers are usually purchased in bales which are placed in an opener/blender or picker which separates the fibers prior to the carding unit. Once the web is formed, it then is bonded by one or more of several known bonding methods. One such bonding method is powder bonding, wherein a powdered adhesive is distributed through the web and then activated, usually by heating the web and adhesive with hot air. Another suitable bonding method is pattern bonding, wherein heated calender rolls or ultrasonic bonding equipment are used to bond the fibers together, usually in a localized bond pattern, though the web can be bonded across its entire surface if so desired. Another suitable and well-known bonding method, particularly when using bicomponent staple fibers, is through-air bonding.

If the nonwoven web is a BCW, it is desirable that the fibers have a denier less than about 2 dpf (2.22 dtex), desirable less than 1.5 dpf (1.66 dtex) and more desirable less that 1 dpf (1.11) dpf. The lower limit of the denier is about 0.1 dpf (dtex). If the denier of the BCW fibers is greater than about 2, there is minimal improvement in the sound attenuation derived from the encasing material.

In one embodiment of the present invention, the encasing material may be a multilayer nonwoven web laminate. Any configuration of the laminated may be used, provided that at least one layer has fibers having a fiber diameter less than about 12 microns. Examples include a meltblown laminate having a meltblown layer with an average fiber diameter less than 12 microns and a second meltblown layer having a fiber diameter greater than 12 microns. Other examples of such laminates include, for example a laminate formed from at least one layer formed from spunbond filaments and the second layer is formed from meltblown filaments, such as a spunbond/meltblown (SM) nonwoven web laminate. In another embodiment, the multilayer nonwoven web laminate includes at least one layer formed from meltblown filaments separating two layers formed from spunbond filaments, such as a spunbond/meltblown/spunbond (SMS) nonwoven web laminate. In this case, the first and third layers are spunbond nonwoven webs. Examples of these nonwoven web laminates are disclosed in U.S. Pat. No. 4,041,203 to Brock et al., U.S. Pat. No. 5,188,885 to Timmons et al, et al, and U.S. Pat. No. 4,374,888 to Bornslaeger which are all herein incorporated by reference in their entirety. The SMS nonwoven web laminate may be made by sequentially depositing onto a moving forming belt first a spunbond fabric layer, then a meltblown fabric layer and last another spunbond layer and then bonding the laminate in a manner described below. Alternatively, the layers may be made individually, collected in rolls, and combined in a separate bonding step. Any of the bonding methods described above may be used; however, it is preferred that thermal bonding or ultrasonic bonding is used to avoid the additional cost associated with the other bonding steps, such as increased material cost, in the case of adhesive bonding or the need to dry the laminate, such as in the case of hydroentangling. Other configurations of the multilayer laminate may be used, for example laminates including a BCW web. The number of layers is not critical to the laminate, provided that the laminate provides some sound attenuation properties. Of these multilayer laminates usable in the present invention, laminates having at least one layer of spunbond and at least one layer of meltblown fibers is generally desired from the standpoint of cost and properties provided.

When thermoplastic spunbond filaments are used as the first nonwoven layer and the third nonwoven layer, if present, the thermoplastic spunbond filaments impart strength and durability to the laminate. Generally, each spunbond layer has a basis weight of about 0.2 to about 4.0 osy (about 6.8 to about 136 gsm). Preferably, the basis weight of each spunbond layer should be in the range of about 0.4 to about 2.5 osy (about 13 to about 85 gsm). In addition, it is preferred, but not required, that both sides of the meltblown filaments are covered with a spunbond nonwoven web.

The meltblown filament layer of the multilayer laminate imparts barrier properties and cushioning properties to the laminate. Generally, the meltblown layer provides between about 0.2 to about 4.0 osy (about 68 to about 136 gsm) of basis weight to the multilayer laminate. Preferably, the basis weight of the meltblown layer is in the range of about 0.5 to about 1.5 osy (about 17 gsm to about 51 gsm). It is further noted that the meltblown layer may be formed using one meltblown die or it may be formed by using several meltblown dies in series. It is not critical to the present invention how the meltblown layer is formed.

The layers of the multilayer laminate may be generally bonded in some manner as they are produced in order to give them sufficient structural integrity to withstand the rigors of further processing into a finished product. Bonding can be accomplished in a number of ways such as hydroentanglement, needling, ultrasonic bonding, adhesive bonding and thermal bonding. Ultrasonic bonding is performed, for example, by passing the multilayer nonwoven web laminate between a sonic horn and anvil roll as illustrated in U.S. Pat. No. 4,374,888 to Bornslaeger, which is hereby incorporated by reference in its entirety.

Thermal bonding of a multilayer laminate may be accomplished by passing the same between the rolls of a calendering machine. At least one of the rollers of the calender is heated and at least one of the rollers, not necessarily the same one as the heated one, has a pattern which is imprinted upon the laminate as it passes between the rollers. As the laminate passes between the rollers, the laminate is subjected to pressure as well as heat. The combination of heat and pressure applied in a particular pattern results in the creation of fused bond areas in the multilayer laminate where the bonds thereon correspond to the pattern of bond points on the calender roll.

Various patterns for calender rolls have been developed. One example is the Hansen-Pennings pattern with between about 10 to 25% bond area with about 100 to 500 bonds/square inch as taught in U.S. Pat. No. 3,855,046 to Hansen and Pennings. Another common pattern is a diamond pattern with repeating and slightly offset diamonds. The particular bond pattern can be any pattern known to those skilled in the art. The bond pattern is not critical for imparting the properties to the liner or mat of the present invention.

The exact calender temperature and pressure for bonding the multilayer laminate depend on thermoplastic polymers from which the nonwoven webs are made. Generally for multilayer nonwoven web laminates formed from polyolefins, the preferred temperatures are between 150° and 350° F. (66° and 177° C.) and the pressure between 300 and 1000 pounds per linear inch. More particularly, for polypropylene, the preferred temperatures are between 270° and 320° F. (132° and 160° C.) and the pressure between 400 and 800 pounds per linear inch. However, the actual temperature and pressures need are highly dependent of the particular thermoplastic polymers used in each of the layers. The actual temperature and pressure used to bond the layers of the laminate together will be readily apparent to those skilled in the art. Of the available method for bonding the layer of the multilayer laminate nonwoven web usable in the present invention, thermal and ultrasonic bonding are preferred due to factors such as materials cost and ease of processing.

The encased insulation material of the present invention can be used where thermal and acoustical insulation is currently used. Generally, the encased insulation material of the present invention is used were there is a need to prevent moisture uptake by the insulation material, where there is a need to prevent the insulation material from becoming airborne during use/or installation, where additional sound attenuation is needed from the insulation material, and/or other locations were film encased insulation is currently used. Examples include architectural applications such as attics, basements and crawl spaces in homes, commercial buildings and in heating, venting and air conditioning systems (HVAC), around appliances, such as dishwashers, refrigerators, clothes washing machines and the like, in vehicles such as cars, trucks, trains, airplanes and the like.

Pressure drop is a measure of the force required to get a volume of air through a sheet. The acoustical insulation nonwoven web of the present invention preferably has a pressure drop at least about 1 mm water at a flow rate of about 32 liters/minute ("L/min."). More preferably, the pressure drop should be about 2 mm to about 15 mm water at a flow rate of about 32 L/min. The pressure drop is measured using ASTM F 779-88 test method.

The Frazier permeability of the encased insulation of the present invention should be less than about 75 cubic feet per minute per square foot (cfm/ft$^2$) (about 22.9 cubic meters per minute per square meter (m$^3$/min./m$^2$). Typically, the Frazier permeability should be less than about 50 cfm/ft$^2$ and preferably less than about 30 cfm/ft$^2$. Ideally, the Frazer permeability should be in the range of about 5 to about 30 cfm/ft$^2$. The Frazier permeability was tested using a Frazier Air Permeability tester available from Frazier Precision Instrument Company and measured in accordance with Federal Test Method 5450, Standard No. 191A.

In preparing the encased insulation article of the present invention, any method can be used to encase the insulation material within the thermoplastic fabric material and the method used is not critical to the present invention. For example, the insulation material may be laid between two sheets of the fabric material and then the two sheet of the fabric material are cut and bonded together around the insulation material. The insulation material may be laid on a sheet of the fabric and the fabric is folded over the insulation material and the edges of the fabric are sealed or bonded together. Other methods include, for example, first forming a pouch from the fabric material having an opening at one end. Next the insulation material may be inserted into the formed pouch at the open end and the open end is then sealed or bonded. Any type of seal or bond may be used so long as the bond or seal does not allow for the escape of the insulation material. Examples of bonding and sealing methods include, adhesive bonding using pressure sensitive or hot melt adhesives, thermal bonding, which is the application of heat to melt the thermoplastic fibers, stitching the edges of the fabric or fabrics together, mechanical fastener such as buttons, zippers, hook and loop fasteners and the like. However, given that the fabric material is prepared from thermoplastic fibers, thermal bonding is a preferred bonding method from the standpoint of cost and processing. It is desirable, however, that the bonding or sealing means is such that the insulation material is not free to move within the encasing fabric to any great degree.

One particular method of forming the encased insulation material is to cut the insulation material and encasing material to the desired shape and bond the edges of the encasing fabric in a single cut and bond operation.

It has been discovered that encasing an insulation material with a fabric material prepared from thermoplastic fibers having an average fiber diameter less than about 12 microns results in a product which alleviates the problems associated with fibrous insulation materials while providing an improvement in the sound attenuation properties of the insulation material and the currently available film encased material. The encased insulation material of the present invention has an improved sound absorption over a broad range of frequencies; while the film encased insulation material has a fairly narrow band of sound absorption properties. In addition, the encased insulation material of the present invention provides a breathable encasement material which prevents or reduces the "pillowing" or "ballooning" problems. Further, the encased insulation has a high coefficient of friction which prevents the material from sliding once placed in its desired location of use.

The encased insulation material of the present invention was tested for sound absorption using a Model # 4206 impedance tube available from Bruel & Kjaer. The test procedures in accordance with ASTM E 1050-98 were followed. The absorption coefficient was recorded and graphed. The encased insulation material of the present invention is effective in attenuating sound up to and beyond 6.3 kHz.

EXAMPLES

Comparative Example 1

A 0.5 inch (1.3 cm) thick piece of fiberglass insulation having a basis weight of about 6.6 osy (226 gsm) and was encased in a 6 mil polyethylene film was formed. The film encased insulation material was tested for permeability and pressure drop. It was found the that the permeability was not detected and that the pressure drop exceeded the test limits of the instrument, due to the film material. Next, the film encased insulation was tested for sound absorption in accordance with ASTM E 1050-98 using a Model # 4206 impedance tube available from Bruel & Kjaer. The results of the absorption testing are shown FIG. 3.

Example 1

A 0.5 inch (1.3 cm) thick piece of fiberglass insulation having a basis weight of about 6.6 osy (226 gsm) and was encased in a 1.25 osy (42.4 gsm) point bonded multilayer laminate having 0.45 osy (15 gsm) meltblown layer sandwiched between two 0.4 osy (14 gsm) spunbond layers available from Kimberly-Clark Corporation, Roswell, Ga. This encased insulation material was tested for permeability and pressure drop. It was found that the permeability was about 26 cfm/ft$^2$ and that the pressure drop was about 5.1 mm of H$_2$O at 32 liters/min. Next, the encased fiberglass was tested for sound absorption in accordance with ASTM E 1050-98 using a Model # 4206 impedance tube available from Bruel & Kjaer. The results of the absorption testing are shown FIG. 3.

Example 2

A 0.5 inch (1.3 cm) thick piece of fiberglass insulation having a basis weight of about 6.6 osy (226 gsm) and was encased in a fine fiber meltblown nonwoven web having fiber with an average fiber diameter of about 5 microns, a basis weight of 60 grams per square meter (gsm), a bulk of 0.064 cm and a density of about 94 kg/m$^3$ available from Kimberly-Clark Corporation, Roswell, Ga. This encased insulation material was tested for permeability and pressure drop. It was found that the permeability was about 14 cfm/ft$^2$ and that the pressure drop was about 10.9 mm of H$_2$O at 32 liters/min. Next, the encased fiberglass was tested for sound absorption in accordance with ASTM E 1050-98 using a Model # 4206 impedance tube available from Bruel & Kjaer. The results of the absorption testing are shown FIG. 3.

Figure 3:
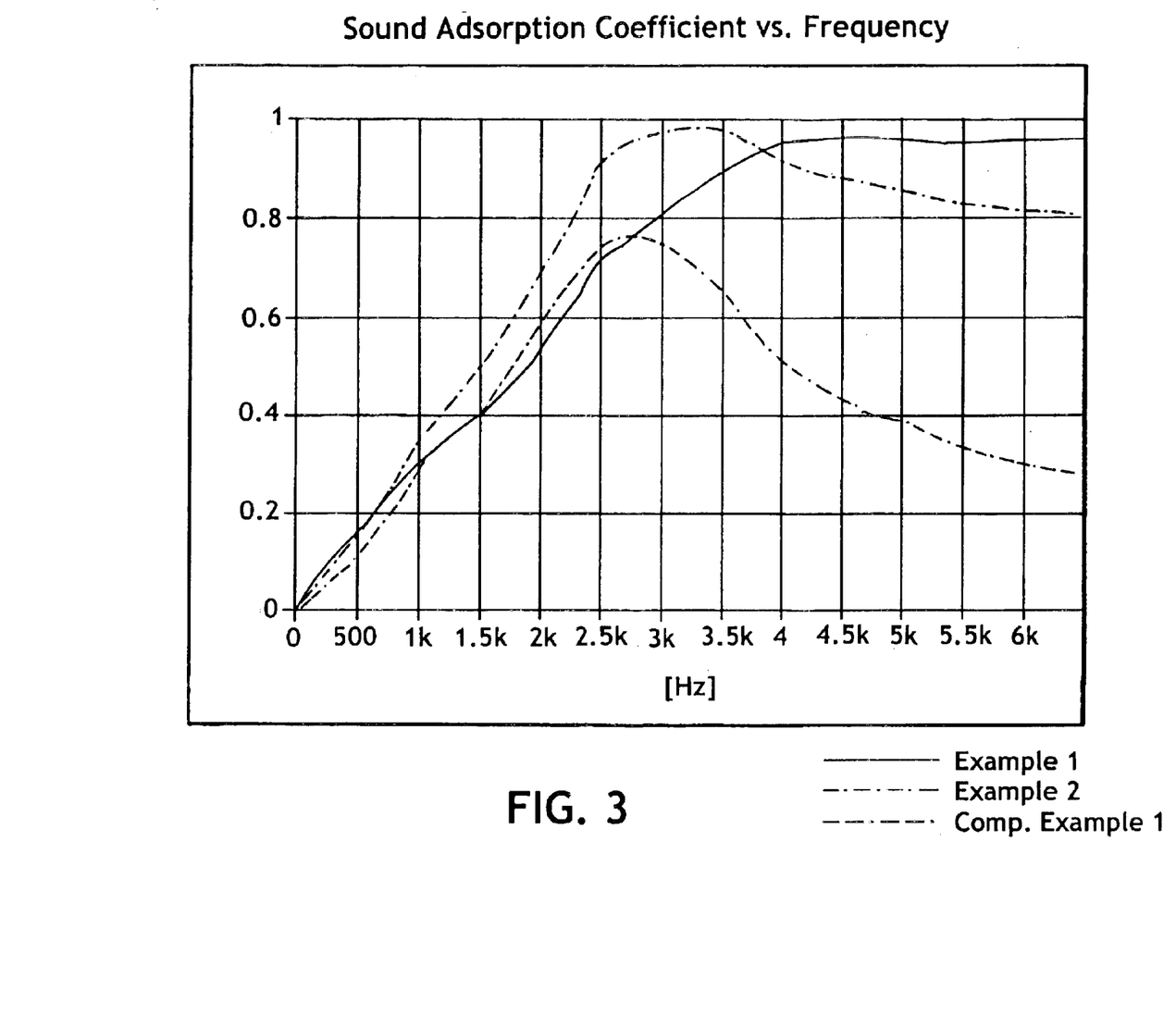
FIG. 3 shows the sound absorption coefficient for the encased insulation material of the present invention and comparative materials.

As can be seen in FIG. 3, the encased insulation material of the present has improved acoustical properties as compared to the film encased insulation material conventionally used in the art where encasement of the insulation material is desired or needed. In addition, the encased insulation material of the present invention protected the insulation material from moisture while allowing the insulation material to breath during use.

While the invention has been described in detail with respect to specific embodiments thereof, and particularly by the example described herein, it will be apparent to those skilled in the art that various alterations, modifications and other changes may be made without departing from the spirit and scope of the present invention. It is therefore intended that all such modifications, alterations and other changes be encompassed by the claims.

We claim:

1. A thermal or acoustical insulation article comprising a core of an insulation material encased within a fabric material comprising thermoplastic fibers, wherein the insulation material is selected from the group consisting of mineral fibers, ceramic fibers, mixtures of ceramic fibers and mineral fibers, foam insulation, and combinations thereof, and further wherein the fabric material comprises a laminate of at least one spunbond nonwoven web and at least one meltblown nonwoven web having an average fiber diameter less than about 12 microns.

2. The insulation article of claim 1, wherein the mineral fibers comprise fiberglass.

3. The insulation article of claim 1, wherein the spunbond nonwoven web comprises multicomponent fibers having at least two components, and the components of the multicomponent fibers are split from one another forming separate fibers having an average fiber diameter less than the starting multicomponent fibers.

4. The insulation article of claim 3, wherein the separate fibers have an average fiber diameter of about 3 to about 12 microns.

5. The insulation article of claim 4, wherein the separate fibers have an average fiber diameter of about 5 to about 8 microns.

6. The insulation article of claim 1, wherein laminate comprises at least one spunbond layer and at least one meltblown layer and at least one of the spunbond layers or the meltblown layers comprises fibers having an average fiber diameter less than 12 microns.

7. The insulation article of claim 6, wherein laminate comprises two spunbond layers and at least one meltblown layer end the meltblown layer is between the two spunbond layers.

8. The insulation article of claim 7, wherein the insulation material comprises fiberglass.

9. The insulation article of claim 7, wherein the meltblown layer comprises fibers having an fiber diameter less than 12 microns.

10. The insulation article of claim 6, wherein the insulation material comprises fiberglass.

11. The insulation article of claim 1, wherein the average fiber diameter of the meltblown web is less than 7 microns.

12. The insulation article of claim 11, wherein the average fiber diameter of the meltblown web is between about 2 and about 6 microns.

13. The insulation article of claim 1, wherein the thermoplastic polymer comprises a polyolefin, a polyester, a polyamide, a polycarbonates, a polyurethanes, a polyvinylchloride, a polytetrafluoroethylene, a polystyrene, or copolymers or blends thereof.

14. The insulation article of claim 13, wherein the thermoplastic polymer comprises a polyolefin.

15. The insulation article of claim 14, wherein the polyolefin comprises polypropylene.

* * * * *

UNITED STATES PATENT AND TRADEMARK OFFICE
CERTIFICATE OF CORRECTION

PATENT NO. : 6,878,427 B2
DATED : April 12, 2005
INVENTOR(S) : Schmidt et al.

It is certified that error appears in the above-identified patent and that said Letters Patent is hereby corrected as shown below:

Column 13,
Line 13, "having an fiber" should read -- having an average fiber --.

Signed and Sealed this

Thirty-first Day of January, 2006

JON W. DUDAS
*Director of the United States Patent and Trademark Office*